(12) United States Patent
Allred et al.

(10) Patent No.: US 6,788,823 B2
(45) Date of Patent: *Sep. 7, 2004

(54) METHOD AND APPARATUS FOR REDUCING MOTION ARTIFACTS AND NOISE IN VIDEO IMAGE PROCESSING

(75) Inventors: Joseph Allred, Centerville, UT (US); R. Larry Anderton, West Jordan, UT (US); Steven E. Curtis, Salt Lake City, UT (US); Barry K. Hanover, Salt Lake City, UT (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/999,697

(22) Filed: Oct. 26, 2001

(65) Prior Publication Data

US 2002/0076117 A1 Jun. 20, 2002

Related U.S. Application Data

(63) Continuation of application No. 09/191,855, filed on Nov. 12, 1998, now Pat. No. 6,310,982.

(51) Int. Cl.[7] .............................................. G06K 9/00
(52) U.S. Cl. ....................................... 382/260; 382/236
(58) Field of Search ............................... 382/260–269, 382/236

(56) References Cited

U.S. PATENT DOCUMENTS 5,521,642 A * 5/1996 Park ...................... 375/240.16
5,903,673 A * 5/1999 Wang et al. ................. 382/236
5,903,892 A * 5/1999 Hoffert et al. ............... 345/716
6,067,322 A * 5/2000 Wang ..................... 375/240.17
6,115,420 A * 9/2000 Wang ..................... 375/240.03
6,310,982 B1 * 10/2001 Allred et al. ................ 382/260

FOREIGN PATENT DOCUMENTS

| EP | 0640908 | 3/1995 |
| FR | 2575888 | 1/1985 |
| JP | 06062283 | 3/1994 |
| JP | 10257356 | 9/1998 |
| WO | WO 97/39572 | 10/1997 |

OTHER PUBLICATIONS

European Search Report for EP 99 30 8993 dated Feb. 13, 2003.

* cited by examiner

*Primary Examiner*—Thomas D Lee
*Assistant Examiner*—Stephen Brinich
(74) *Attorney, Agent, or Firm*—McAndrews, Held & Malloy, Ltd.; Peter J. Vogel; Michael A. Dellapenna

(57) ABSTRACT

A method and apparatus for reducing noise and motion artifacts in pixels of a processed or displayed video image by filtering pixel values of the video image based on a first frame having currently stored (filtered) pixel values and a second frame having recently captured but not yet filtered pixel values. The apparatus includes a spatial filter for computing a motion value of a pixel of interest by averaging difference values of selected pixels surrounding the pixel of interest. Also included is a filter function means for producing an output difference value of the pixel of interest based on the motion value and an adder for adding the output difference value to the first frame filtered pixel value of the pixel of interest. Thus, each pixel of the video image is filtered according to the amount of motion in the video image.

19 Claims, 3 Drawing Sheets

| K1 | K2 | K3 | K4 | K5 |
|---|---|---|---|---|
| K6 | K7 | K8 | K9 | K10 |
| K11 | K12 | X(n) | K13 | K14 |
| K15 | K16 | K17 | K18 | K19 |
| K20 | K21 | K22 | K23 | K24 |

*Fig. 5a*

| K1 | K2 | K3 |
|---|---|---|
| K4 | X(n) | K5 |
| K6 | K7 | K8 |

*Fig. 5b*

METHOD AND APPARATUS FOR REDUCING MOTION ARTIFACTS AND NOISE IN VIDEO IMAGE PROCESSING

This application is a continuation of U.S. patent application Ser. No. 09/191,855, filed on Nov. 12, 1998, now U.S. Pat. No. 6,310,982, which is incorporated herein by reference in its entirety.

BACKGROUND OF THE INVENTION

1. The Field of the Invention

This invention relates generally to reducing motion artifacts and noise in video image processing, and more particularly, to a method and apparatus by which video images are filtered on a per pixel basis over time, from frame to frame.

2. The Background Art

It is known in the art to reduce noise in video images by filtering digital data (that represents each frame of the video images) with a temporal filter (also known as a "recursive filter"). A temporal filter can be realized through hardware or software, with hardware realizations commonly implementing multiplier or a look up table for holding the data representative of the gain coefficients of pixel difference values. Pixel difference values are the difference between a pixel value from one frame to the next, the pixel value being a set of bits from the digital data of one frame. A temporal filter performs noise reduction by operating on each single pixel in the frame or array, storing pixel values of each single pixel for each video frame over time, determining the difference between a pixel value of the pixel in the current or incoming frame and the pixel value of the pixel in the immediately previous or filtered fame, adding a portion of this difference value to the pixel value (dependent on the filter or gain coefficients) to the pixel value of the immediately previous or filtered frame to obtain a new filtered pixel value for each pixel in the frame, storing and displaying or outputting the new pixel value. The amount of the difference value added to the pixel value of the immediately previous frame is a fractional part of the difference value and is determined through operator choice. For example, an operator could select four frames of averaging which would cause the amount added to the pixel value of the immediately previous frame to be 0.25 (or ¼) of the difference value. If an operator selects eight frames of averaging that would cause the amount added to the pixel value of the immediately previous frame to be 0.124 (or ⅛) of the difference value. Thus, the greater the averaging level applied, the smaller fraction of the difference value is added to the previous pixel value. In other words, temporal filtering is a running average of the incoming pixel values.

The drawback of simple temporal filters is that they are unable to distinguish between noise and motion in a live image, so filtering occurs whether the changes in pixel difference values are caused by undesirable noise or acceptable motion. When averaging occurs for pixel difference values created as a result of motion, the filtered video image has a smearing or blurring where the motion occurs. Thus, in an effort to reduce noise, temporal filters undesirably reduce the clarity of moving images.

In view of the foregoing, it would be desirable to provide a filter that adjusts the amount of filtering according to the amount of motion in the video image.

OBJECTS AND SUMMARY OF THE INVENTION

It is an object of the present invention to provide a method and apparatus for obtaining improved video images with reduced motion artifacts and reduced noise.

It is another object of the invention to provide a method and apparatus for decreasing the amount an image is filtered when the image is moving or a portion of the image is moving. Reducing the temporal filtering when the image is moving reduces the smearing or blurring in the moving portion of the image and maintains good noise filtering of the non-moving portion of the image.

It is another object of the invention to provide such a method and apparatus for maximizing filtering of noise from stationary images or portions of an image.

The above objects and others not specifically recited are realized through a method and apparatus for reducing noise in pixels of a displayed video image by filtering pixel values of the pixels of the video image based on a first frame having currently filtered pixel values and a second frame having recently captured but not yet filtered pixel values. One illustrative method includes the steps of:

(a) storing in memory digital data representing the filtered value or (after the first cycle) filtered values of the image for each pixel in the frame, each pixel having a pixel value represented by a set of bits of the digital data;

(b) capturing digital data representing values of the image for each pixel in the second or subsequent frames, each pixel having an unfiltered pixel value represented by a set of bits of the digital data;

(c) selecting, based on scanning techniques, a pixel of interest from among the pixels in the video image;

(d) computing difference values of both (i) the selected pixel or pixel of interest and (ii) the pixels of a matrix or kernel surrounding the pixel of interest, the difference values each being the difference between the initial or filtered pixel value of a pixel in the stored frame and the incoming or unfiltered pixel value of the same pixel location in the next frame;

(e) averaging the difference values of the pixels in the matrix or kernel surrounding the pixel of interest (a spatial filter) to obtain a motion value with the noise filtered down;

(f) computing the filtering level for the pixel of interest in the frame or array, based on the amount of filtering desired and according to the motion value associated with each pixel of interest. Multiply this filtering level times the pixel of interest value; and (g) adding this computed pixel of interest value to the initial or filtered value of the stored image to become the new filtered value of the stored image.

This temporal (recursive) and motion filter process is to be completed for each of the unfiltered incoming pixel values of the incoming frame image.

The new filtered pixel values will then be displayed or output as the processed image. Thus, a new frame of digital data representing filtered pixel values is produced in place of the unfiltered pixel values of the second frame. This new frame is output or displayed and the whole process repeats for the next frame of unfiltered pixel values.

Additional objects and advantages of the invention will be set forth in the description which follows, and in part will be apparent from the description, or may be learned by the practice of the present invention. The objects and advantages of the invention may be realized and obtained by means of the instruments and combinations particularly claimed in the appended claims.

BRIEF DESCRIPTION OF THE DRAWINGS

The above and other objects, features, and advantages of the invention will become apparent from a consideration of the following detailed description presented in connection with the accompanying drawings in which:

FIG. 5A illustrates a diagram of one embodiment of a pixel matrix or kernel of the present invention, wherein a 5×5 kernel is illustrated;

FIG. 5B illustrates a block diagram of one embodiment of a kernel of the present invention wherein a 3×3 kernel is illustrated.

DETAILED DESCRIPTION OF THE INVENTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the appended claims.

GENERAL DESCRIPTION OF INVENTION

The present invention is a method and apparatus for reducing motion artifacts and noise in video image processing wherein the amount of filtering in a video image in the area where there is motion depends on the amount of motion detected in that area of the video image.

A video image is created from a large number of picture elements (referred to as "pixels") that are arranged to display imaging patterns. These image patterns can be either color or gray scale images with the brightness and color of the pixels being represented by digital data. Each pixel of the video image is represented by a set of bits from the digital data and each set of bits is referred to herein as a "pixel value." A pixel value determines the brightness and color or gray scale of a particular pixel which can change from frame to frame in a video image. For example, if a video image is progressively darkening from frame to frame, a pixel in the video image will have a different pixel value for each frame of the video image. When the pixel value of a pixel location in one frame is subtracted from the pixel value of the same pixel location in another frame, a pixel difference value is obtained.

The apparatus includes a spatial filter combined with a temporal filter so that a result obtained from the filtering with the spatial filter is used to control the amount of filtering performed by the temporal filter in a localized area. In other words, when the spatial filter (processed kernel data) over time (temporal data from frame to frame) detects significant motion around the pixel of interest, the temporal filter for that pixel (otherwise known as a "recursive filter") passes the video image with reduced or minimal filtering of the incoming image for that pixel and this also reduces motion artifacts. On the other hand, if the spatial filter detects very little motion around the pixel of interest, the temporal filter is adjusted for maximum filtering of the noise for that pixel. Thus, the amount of filtering performed by the temporal filter is adjusted according to the amount of motion that is detected in the video image. This process is repeated for each pixel of the image array for each frame of image data.

Difference values from a group of pixels (or kernel) in the video image are used in the spatial filter to determine a "motion value" that corresponds to the amount of temporal filtering to be performed on the video image. Below is a detailed description of this procedure.

DETAILED DESCRIPTION

Figure 1:
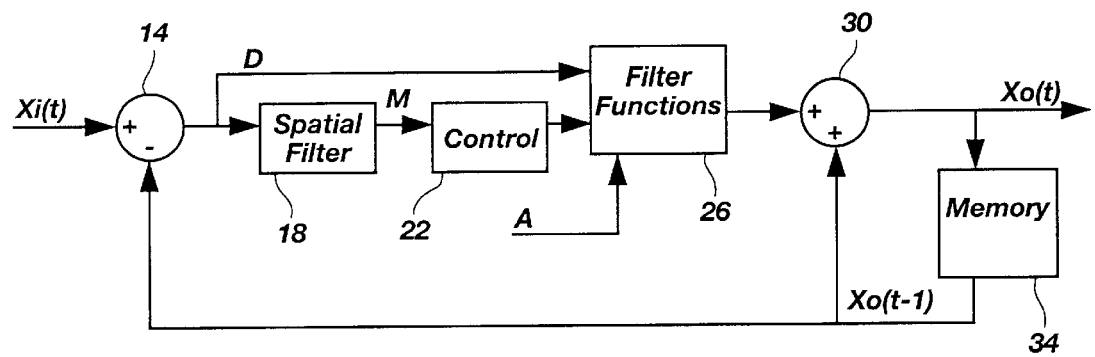
FIG. 1 illustrates a block diagram of a pixel filtering model for reducing noise and motion artifacts in each pixel of a video image, the motion value controls the filtering functions.

FIG. 1 illustrates a block diagram of a temporal pixel filtering model of a video image filter 10 for reducing noise and motion artifacts in each pixel of each frame in a video image. The pixel values for an incoming image frame are represented by Xi(t) while the pixel values for an output image frame are represented by Xo(t). Chronologically, Xi(t) represents pixels of a frame in the video image prior to filtering and Xo(t) represents the pixel values in the same frame after being filtered. The symbol Xo(t−1) represents the immediately previously displayed pixel values, i.e., the most recently stored pixel values that were obtained from the previous filtering process. When pixel values Xi(t) of a frame of the most recently acquired values are supplied to the video image filter 10, a subtractor 14 calculates the difference between the pixel input values Xi(t) and the most recently stored pixel values Xo(t−1) to obtain pixel difference values "D" for each of the pixels in the input frame of the video image. A spatial filter 18 then spatially filters these difference values to obtain a motion value "M". A control unit 22 receives the motion value and produces a signal for controlling filter functions 26. The filter functions 26 is controlled by input "A" which is selected by a user depending on the amount of filtering desired in the video image filter 10, and by control unit 22 based on motion. The filter functions 26 then sends a resultant signal value (an "output difference value") to an adder 30 for adding the resultant signal to the stored pixel values Xo(t−1) to produce output pixel values Xo(t) for current output and to store the output pixel values in a memory 34. This output can be displayed or used in other processes.

Figure 2:
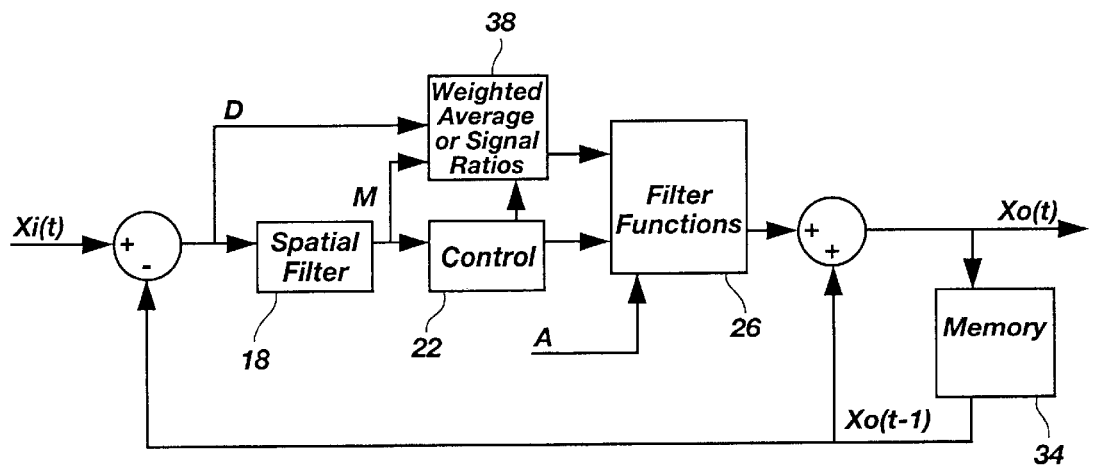
FIG. 2 illustrates a block diagram of a pixel filtering model for reducing noise and motion artifacts in each pixel of a video image the motion value also controls the filtering functions with spatial filter values available to be used as an input to the temporal filter, and this control is based on the motion value control signal.

FIG. 2 illustrates additional features of the pixel filtering model of the video image filter 10. The pixel difference values represented by "D" are used as input to the spatial filter 18 and the filter functions 26. When large amounts of motion are present, the use of the pixel difference value with small filtering coefficients can add unwanted noise to the output. FIG. 2 shows that these difference values are routed through and mixed with the spatial filtered motion values, in the weighted averaging unit 38. The motion value "M" is produced by the spatial filter 18 when the spatial filter averages the difference values of pixels in the kernel (or the pixel of interest). This motion value "M" is then used as input to both the control unit 22 and the weighted averaging unit 38. The weighted averaging unit 38 selects different ratios of the inputs from the control signals and based on the motion value "M" and the difference value "D" to calculate inputs to the filter functions 26. The control takes a weighted average of the difference values and the motion value which includes (i) the average of the difference values surrounding the pixel of interest (or motion value "M"), (ii) the difference value of the pixel of interest, and (iii) a value that is some ratio or combination of (i) and (ii). The weighted averaging unit helps avoid adding unwanted noise to the output by adjusting pixel difference values with small filtering coefficients when large amounts of motion are present.

FIG. 2 shows the control unit 22 receiving the motion value "M" from the spatial filter 18 to determine control signals to be sent to the weighted averaging unit 38 and to filter functions 26. Some of the control signals cause the weighted averaging unit 38 to select (through a look up table and multiplexor) a mix of the signals produced from the "D" and "M" inputs and allows the weighted averaging unit signal to be sent to the filter functions 26. The filter functions' 26 signal output is based on the mix of data from the spatial filter signal, an input signal from the control unit based on motion "M" and the user defined input "A". These input signals to the filter functions 26 are used to produce the output value of the temporal and spatial filter for each pixel of the array. Thus, FIG. 2 illustrates in greater detail how the difference values "D" and spatial information "M" are used to control the temporal filter to reduce both noise and motion artifacts.

Figure 3:
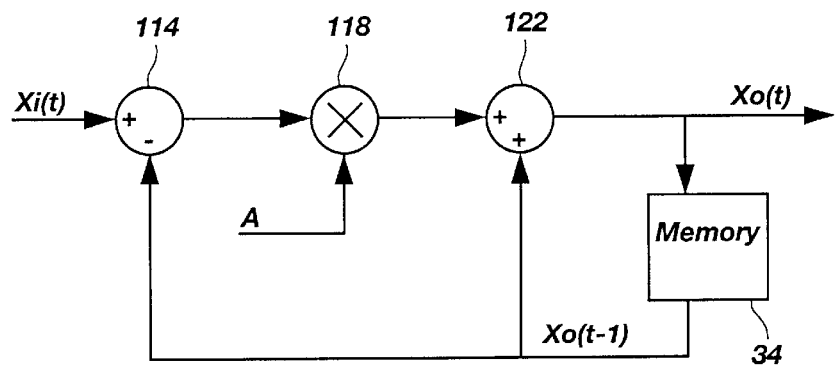
FIG. 3 shows a block diagram, for illustrative purposes, of a standard model of a temporal or recursive filter that is commonly available in the prior art.

FIG. 3 shows a block diagram of a temporal filter 110 of the prior art to assist in the understanding of the present invention. FIG. 3 shows pixel value input signals Xi(t) from the current frame, pixel value output signals Xo(t) from the current frame, and stored pixel values from an immediately previously displayed frame Xo(t−1). In the temporal filter, a subtractor 114 takes the difference between Xi(t) and Xo(t−1) and feeds these difference values to a multiplier or look up table 118. The multiplier 118 multiplies the difference values by an amount "A" which is selected by a user. The output of the multiplier is then sent to an adder 122 where it is added to the previously displayed pixel values Xo(t−1) to obtain the output pixel values Xo(t). A typical function of the prior art temporal filter can be illustrated by the following formula (using the symbols from FIG. 3 as described above):

$$Xo(t)=A[Xi(t)-Xo(t-1)]+Xo(t-1)$$

As explained in relation to FIGS. 1 and 2, the present invention provides that the signal that is added to the pixel values of the previously displayed frame Xo(t−1) differs according to the amount of motion in the video image for the given pixel. In other words, the present invention modifies the temporal filter 110 of FIG. 3 by adding hardware to control both the difference values and the user input "A" that is sent to the multiplier 118. The added controls increase or decrease the temporal filtering as the motion value "M" changes.

Figure 4A:
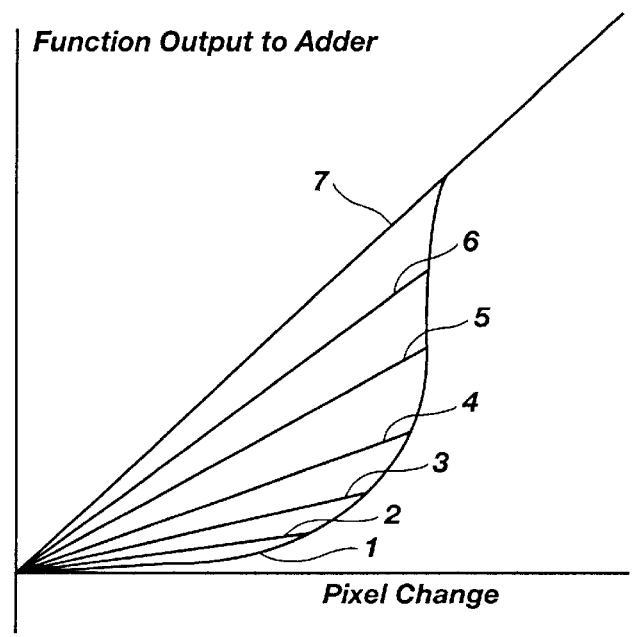
FIG. 4A illustrates a graph of curves for filter functions representing an example of a family of output values of a look up table based on motion control for noise reduction, the input is the pixel difference value, "D" (x axis), and the output (y axis) is input for the adder.
Figure 4B:
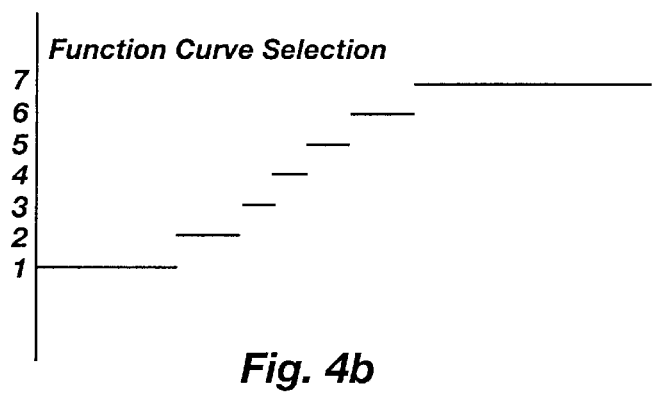
FIG. 4B is a graph of curve selections for the control means (x axis) vs. the motion value (y axis) to be used to control the temporal filter transfer functions.
Figure 4C:
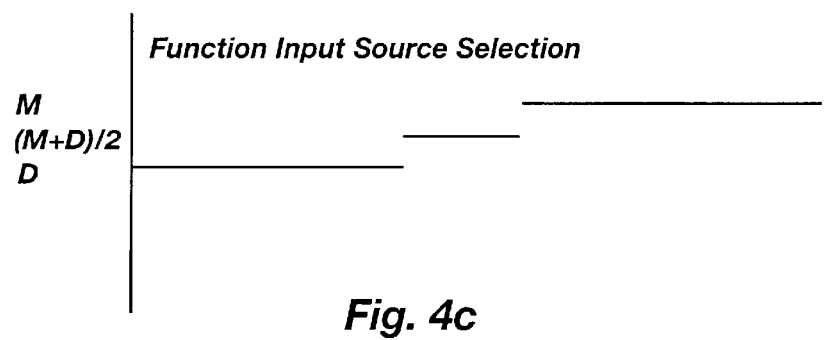
FIG. 4C a graph of spatial input selections for the control means, to be used as the processed pixel difference value (x axis) vs. motion value (y axis) to be used as inputs to the filter functions means.

The data values used by the control and filter function are developed through test and experimentation to optimize the process. They are non-linear equations and control information. An example of one form of the information is found in the FIGS. 4A, 4B, and 4C. FIG. 4A is a family of curves, each curve with different amounts of filtering to be used on the individual pixel differences. FIG. 4B is a set of control outputs where different filtering levels (FIG. 4A) are selected between based on the amount of motion around the pixel. FIG. 4C is another set of control outputs where different ratios of pixel change or delta vs. spatial filtered pixel change and spatial filter size are selected from for use in the filter functions.

Referring again to FIGS. 1 or 2, the motion value "M" of the present invention is calculated based on a group of difference values surrounding and including a pixel of interest. This group of pixels, or kernel, is used in the spatial filter to produce the motion value "M." FIGS. 5A and 5B illustrate two different kernels of different sizes, i.e., 5×5 and 3×3, respectively. Each kernel represents pixels in which the pixel difference values for a pixel of interest and the selected pixels surrounding the pixel of interest are stored. For example, FIG. 5A shows pixels k1, k2, k3, etc., wherein the spatial filter 18 (see FIGS. 1 and 2) calculates an average or weighted average of the pixel difference values for pixels surrounding a pixel of interest x(n) to produce the motion value "M."

With the apparatus of FIG. 2, each pixel of a video frame is filtered using a scanning technique, i.e., the pixels are filtered in order. The method for reducing noise in pixels to be displayed as a video image is accomplished by the following steps:

(a) storing digital data in memory representing filtered color or gray scale imaging of each pixel in a first frame of a video image, each pixel having a filtered pixel value being represented by a set of bits of the digital data;

(b) capturing digital data representing color or gray scale imaging of each pixel in a second frame of the video image, each pixel having an unfiltered pixel value being represented by a set of bits of the digital data;

(c) selecting, based on scanning techniques, a pixel of interest from among the pixels in the video image;

(d) computing difference values of the pixel of interest and of pixels surrounding the pixel of interest, the difference values each being the difference between the pixel value of a pixel in the first frame and the pixel value of the same pixel in the second frame;

(e) averaging the difference values of the pixels surrounding the pixel of interest to obtain a motion value; and (f) temporally filtering the pixel value of the pixel of interest according to the motion value.

Steps (c), (d), (e), and (f) are then repeated for each pixel of the second frame to produce a new frame of displayed pixel data.

As shown in FIG. 2, step (f) can also include taking a weighted average of the difference values and the motion value which includes (i) obtaining the average of the difference values surrounding the pixel of interest, (ii) calculating the difference value of the pixel of interest, and (iii) calculating a value that is some combination of (i) and (ii).

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An apparatus for reducing noise and motion artifacts in pixels of a displayable video image by filtering pixel values of the pixels based on a first frame of video having filtered pixel values and a second frame of video having unfiltered pixel values, the apparatus comprising:

a subtractor to produce difference values by computing a difference between the filtered pixel values of the first frame and the unfiltered pixel values of the second frame;

a spatial filter, associated with the subtractor, to compute a motion value of a pixel of interest in the first frame of video by averaging the difference values of pre-selected pixels surrounding the pixel of interest; and a temporal filter, coupled to the spatial filter, to receive the motion value and filter the pixel value of the pixel of interest according to the motion value, wherein the temporal filter further comprises:

a difference filter to produce an output difference value of the pixel of interest based on the motion value, wherein the difference filter comprises a multiplier or memory look-up table for multiplying the motion value of the pixel of interest with a fractional number determined from the motion value, wherein the multiplier produces the output difference value such that as the image motion increases the filter function multiplier decreases; and an adder for adding the output difference value to the first frame filtered pixel value of the pixel of interest.

2. An apparatus as in claim 1 wherein the difference filter comprises a look-up table for producing the output difference value based on the difference value of the pixel of interest and the motion value of a group of pixels around the pixel of interest.

3. An apparatus as in claim 1 wherein the pre-selected pixels surrounding the pixel of interest comprise a group of pixel difference values about a pixel of interest selected from the group consisting of a 5.times.5 array of pixel difference values, a 3.times.3 array of pixel difference values, and an array shape optimized for the image resolution and image type for measuring localized image motion.

4. An apparatus as in claim 3 wherein the spatial filter averages the pixel difference values of pixels in a kernel array.

5. An apparatus as in claim 1 wherein the pixel of interest comprises a pixel of the first frame of video that is selected based on a scanning technique.

6. An apparatus as in claim 1 further comprising a control unit and a weighted averaging unit that receives a control signal from the control unit, wherein the control signal developed by the control unit selects different weights and ratios of the difference value and the motion value, both signals having been scaled to the same relative magnitude.

7. An apparatus as in claim 6 wherein the weighted averaging unit further comprises: a first input for receiving the difference values produced by the subtractor; a second input for receiving the motion value produced by the spatial filter; and circuitry for calculating inputs and ratios for the temporal filter function based on both the difference value and the motion value from the spatial filter.

8. An apparatus as in claim 6 further comprising a filter function unit having an input wherein the filter function unit input receives a control signal produced by the control unit and the difference value as processed by the weighted average unit.

9. A method for reducing noise and motion artifacts in a video image by filtering pixel values of a first frame of video having filtered pixel values, and a second frame of video having unfiltered pixel values, the method comprising the steps of:

(a) selecting a pixel of interest from among pixels in the first frame of video;

(b) computing difference values of the pixel of interest and pixels surrounding the pixel of interest, wherein the difference values are the differences between the filtered pixel value of a pixel in the first frame and the unfiltered pixel value of the same pixel in the second frame;

(c) averaging the difference values of the pixels surrounding the pixel of interest to obtain a motion value; and (d) temporally filtering the filtered pixel value of the pixel of interest according to the motion value and taking a weighted average of the difference values based on the motion value.

10. A method as in claim 9 further comprising the step of repeating steps (a), (b), (c), and (d) for each pixel of the second frame to produce a new frame of pixel data.

11. A method as in claim 9 wherein taking the weighted average includes (i) obtaining the average of the difference values surrounding the pixel of interest, (ii) calculating the difference value of the pixel of interest, and (iii) calculating a value that is some combination of (i) and (ii), based on the motion value.

12. A method as in claim 9 wherein step (d) further comprises the steps of producing an output difference value of the pixel of interest and adding the output difference value to the first frame filtered pixel value of the pixel of interest.

13. A method as in claim 12 wherein the step of producing the output difference value comprises the steps of: creating a look-up table having tabulated data that corresponds to output difference values relating to a range of different motion values; acquiring the motion value as input to the look-up table; and producing the output difference value from the look-up table according to the input motion value.

14. A method as in claim 12 wherein the step of producing an output difference value comprises the step of selecting the difference value of the pixel of interest.

15. A method as in claim 12 wherein the step of producing an output difference value comprises the step of selecting the average difference value of the pixels surrounding the pixel of interest.

16. A method as in claim 12 wherein the step of producing an output difference value comprises the step of calculating a value based on a combination of the difference value of the pixel of interest and the average difference value of the pixels surrounding the pixel of interest.

17. A method for reducing noise and motion artifacts in a video image by filtering pixel values of a first frame of video having filtered pixel values, and a second frame of video having unfiltered pixel values, the method comprising the steps of:

(a) selecting a pixel of interest from among pixels in the first frame of video;

(b) computing difference values of the pixel of interest and pixels surrounding the pixel of interest, wherein each difference value is the difference between the filtered pixel value of a pixel in the first frame and the unfiltered pixel value of the corresponding pixel in the second frame;

(c) averaging the difference values for the pixels surrounding the pixel of interest to obtain a motion value; and (d) temporally filtering the filtered pixel value of the pixel of interest according to the motion value by adding an output difference value to the pixel of interest, wherein the output difference value is based on a combination of the difference value of the pixel of interest and the average difference value of the pixels surrounding the pixel of interest and taking a weighted average of the difference values based on the motion value.

18. An apparatus for reducing noise and motion artifacts in pixels of a displayable video image by filtering pixel values of the pixels based on a first frame of video having filtered pixel values and a second frame of video having unfiltered pixel values, the apparatus comprising:

a subtractor to produce difference values by computing a difference between the filtered pixel values of the first frame and the unfiltered pixel values of the second frame;

a spatial filter, associated with the subtractor, to compute a motion value of a pixel of interest in the first frame of video by averaging the difference values of preselected pixels surrounding the pixel of interest;

a temporal filter, coupled to the spatial filter, to receive the motion value and filter the pixel value of the pixel of interest according to the motion value, wherein the temporal filter further comprises: (a) a difference filter to produce an output difference value of the pixel of interest based on the motion value; and (b) an adder for adding the output difference value to the first frame filtered pixel value of the pixel of interest; and a control unit and a weighted averaging unit that receives a control signal from the control unit, wherein the control signal developed by the control unit selects different weights and ratios of the difference value and the motion value, both signals having been scaled to the same relative magnitude.

19. An apparatus as in claim 18 further comprising a filter function unit having an input wherein the filter function unit receives a control signal produced by the control unit and the difference value as processed by the weighted average unit, and wherein the weighted averaging unit further comprises: a first input for receiving the difference values produced by the subtractor; a second input for receiving the motion value produced by the spatial filter; and circuitry for calculating inputs and ratios for the temporal filter function based on both the difference value and the motion value from the spatial filter.

* * * * *